United States Patent
Windham et al.

(10) Patent No.: US 7,142,866 B2
(45) Date of Patent: Nov. 28, 2006

(54) LOAD LEVELING IN MOBILE AD-HOC NETWORKS TO SUPPORT END-TO-END DELAY REDUCTION, QOS AND ENERGY LEVELING

(75) Inventors: William Anthony Windham, Palm Bay, FL (US); Richard Charles Bernhardt, Melbourne, FL (US); Joseph Bibb Cain, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 540 days.

(21) Appl. No.: 10/657,959

(22) Filed: Sep. 9, 2003

(65) Prior Publication Data

US 2005/0054346 A1    Mar. 10, 2005

(51) Int. Cl.
*H04Q 7/20* (2006.01)
(52) U.S. Cl. ............. 455/452.2; 455/453; 455/452.1
(58) Field of Classification Search ............. 455/452.1, 455/452.2, 453, 450, 445, 422.1, 403; 709/238, 709/239, 240, 241; 370/235, 252, 328, 338
See application file for complete search history.

(56) References Cited

U.S. PATENT DOCUMENTS

| | | | |
|---|---|---|---|
| 5,381,404 A * | 1/1995 | Sugano et al. ............. 370/238 |
| 5,412,654 A | 5/1995 | Perkins ...................... 370/94.1 |
| 5,581,703 A | 12/1996 | Baugher et al. ......... 395/200.6 |
| 5,884,174 A | 3/1999 | Nagarajan et al. .......... 455/436 |
| 5,987,011 A | 11/1999 | Toh ............................ 370/331 |
| 6,189,033 B1 | 2/2001 | Jin et al. ..................... 709/255 |
| 6,216,006 B1 | 4/2001 | Scholefield et al. ........ 455/450 |
| 6,304,556 B1 | 10/2001 | Haas .......................... 370/254 |
| 6,335,927 B1 | 1/2002 | Elliott et al. ................ 370/352 |
| 6,349,091 B1 | 2/2002 | Li .............................. 370/238 |
| 6,377,548 B1 | 4/2002 | Chuah ........................ 370/233 |
| 6,385,174 B1 | 5/2002 | Li .............................. 370/252 |
| 6,396,814 B1 | 5/2002 | Iwamura et al. ............ 370/256 |
| 6,449,558 B1 | 9/2002 | Small .......................... 703/21 |
| 6,456,599 B1 | 9/2002 | Elliott ........................ 370/254 |
| 6,473,467 B1 | 10/2002 | Wallace et al. ............. 375/267 |
| H2051 H | 11/2002 | Zhu et al. .............. 370/395.21 |
| 6,493,759 B1 | 12/2002 | Passman et al. ............ 709/227 |
| 6,501,741 B1 | 12/2002 | Mikkonen et al. .......... 370/310 |

(Continued)

OTHER PUBLICATIONS

Zhu, *Medium Access Control and Quality-of-Service Routing for Mobile Ad Hoc Networks*, PhD thesis, Department of Computer Engineering, University of Maryland, College Park, MD, 2001.

(Continued)

*Primary Examiner*—Sonny Trinh
(74) *Attorney, Agent, or Firm*—Allen, Dyer, Doppelt, Milbrath & Gilchrist, P.A.

(57) ABSTRACT

The method routes message data from a source node to a destination node in a mobile ad hoc network (MANET). The MANET has a plurality of intermediate mobile nodes between the source node and the destination node, and a plurality of wireless communication links connecting the nodes together. The method includes prioritizing the message data according to a type-of-service (ToS), discovering routes from the source node to the destination node, and ranking the discovered routes according to quality of service (QoS). Message data is distributed to the destination node on the discovered routes based upon the ToS of the message data and the QoS of the discovered routes, including distributing message data having a same ToS on multiple discovered routes, and distributing message data having higher priority ToS, e.g. delay sensitive message data and/or large volume message data, on higher ranked discovered routes.

21 Claims, 4 Drawing Sheets

U.S. PATENT DOCUMENTS

| | | | |
|---|---|---|---|
| 6,515,972 B1 | 2/2003 | Gage et al. | 370/328 |
| 6,522,628 B1 | 2/2003 | Patel et al. | 370/230.1 |
| 6,535,498 B1 | 3/2003 | Larsson et al. | 370/338 |
| 6,775,258 B1* | 8/2004 | van Valkenburg et al. | 370/338 |
| 6,879,574 B1* | 4/2005 | Naghian et al. | 370/338 |
| 6,954,435 B1* | 10/2005 | Billhartz et al. | 370/252 |
| 7,007,102 B1* | 2/2006 | Billhartz et al. | 709/238 |
| 2001/0033556 A1 | 10/2001 | Krishnamurthy et al. | 370/329 |
| 2002/0018448 A1 | 2/2002 | Amis et al. | 370/255 |
| 2002/0082035 A1 | 6/2002 | Aihara et al. | 455/518 |
| 2002/0101822 A1 | 8/2002 | Ayyagari et al. | 370/235 |
| 2002/0103893 A1 | 8/2002 | Frelechoux et al. | 709/223 |
| 2003/0053424 A1 | 3/2003 | Krishnamurthy et al. | 370/316 |
| 2003/0067941 A1 | 4/2003 | Fall | 370/468 |
| 2003/0202468 A1* | 10/2003 | Cain et al. | 370/229 |
| 2005/0053003 A1* | 3/2005 | Cain et al. | 370/235 |
| 2005/0053004 A1* | 3/2005 | Cain et al. | 370/235 |
| 2005/0053005 A1* | 3/2005 | Cain et al. | 370/235 |
| 2005/0053094 A1* | 3/2005 | Cain et al. | 370/469 |

OTHER PUBLICATIONS

Mirhakkak et al., *Dynamic Quality-of-Service for Mobile Ad Hoc Networks*, MITRE Corp., 2000.

Das et al., *Routing in Ad-Hoc Networks Using Minimum Connected Dominating Sets*, IEEE Int. Conf. On Commun. (ICC '97), 1997.

Das et al., *Routing in Ad-Hoc Networks Using a Spine*, IEEE Int. Conf. On Computer Commun. and Networks (IC3N '97), 1997.

Raghunathan et al., Gateway Routing: *A Cluster Based Mechanism for Recovery from Mobile Host Partitioning in Cellular Networks*, Proceedings of the 3rd IEEE Symposium on Application-Specific Systems and Software Engineering Technology (ASSET'00), 2000.

Chen et al., *Clustering and Routing in Mobile Wireless Networks*, Nortel Networks and Computer Science, SITE, University of Ottawa, no date available.

Krishna et al., *A Cluster Based Approach for Routing in Dynamic Networks*, ACM Computer Communications Review, 27(2), Apr. 1997.

Chiang, *Routing in Clustered Multihop, Mobile Wireless Networks with Fading Channel*, Proceedings of IEEE SICON '97, Apr. 1997, pp. 36-45.

Gerla, *Clustering and Routing in Large Ad Hoc Wireless Nets*, Computer Science Department, University of California, Los Angeles, Final Report 1998-99 for MICRO project 98-044.

Van Dyck et al., *Distributed Sensor Processing Over an Ad-Hoc Wireless Network: Simulation Framework And Performance Criteria*, Proceedings IEEE Milcom, Oct. 2001.

Lin et al., *Adaptive Clustering for Mobile Wireless Networks, IEEE Journal on Selected Areas in Communications*, 15(7), Sep. 1997.

McDonald, PhD. *Dissertation Proposal: A Mobility-Based Framework for Adaptive Dynamic Cluster-Based Hybrid Routing in Wireless Ad-Hoc Networks*, University of Pittsburgh, 1999.

Royer et al., *A Review of Current Routing Protocols for Ad Hoc Mobile Wireless Networks*, IEEE Personal Communications, Apr. 1999, pp. 46-55.

Corson et al., *A Reservation-Based Multicast(RBM) Routing Protocol for Mobile Networks: Initial Route Constructions Phase*, ACM/I. 1, No. 4, 1995, pp. 1-39.

Xiao et al., *A Flexible Quality of Service Model for Mobile Ad Hoc Networks*, IEEE VTC2000-spring, Tokyo, Japan, May 2000.

Wu et al., *QoS Support in Mobile Ad Hoc Networks*, Computing Science Department, University of Alberta, no date available.

Corson et al., *Mobile Ad Hoc Networking(MANET): Routing Protocol Performance Issues and Evaluation Considerations*, Network Working Group, Internet Engineering Task Force (IETF) MANET Working Group, Internet Draft, Jan. 1999.

Haas et al., *The Bordercast Resolution Protocol (BRP) for Ad Hoc Networks*, Internet Engineering Task Force (IETF) MANET Working Group, Internet Draft, Jun. 2001.

Haas et al., *The Interzone Routing Protocol (IERP) for Ad Hoc Networks*, Internet Engineering Task Force (IETF) MANET Working Group, Internet Draft, Jun. 2001.

Haas et al., *The Intrazone Routing Protocol (IERP) for Ad Hoc Networks*, Internet Engineering Task Force (IETF) MANET Working Group, Internet Draft, Jun. 2001.

Clausen et al., *Optimized Link State Routing Protocol*, Internet Engineering Task Force (IETF) MANET Working Group, Internet Draft, Oct. 31, 2001.

Perkins et al., *Quality of Service in Ad hoc On-Demand Distance Vector Routing*, Internet Engineering Task Force (IETF) MANET Working Group, Internet Draft, Jul. 2000.

Park et al., *Temporally-Ordered Routing Algorithm(TORA)Versoin 1 Functional Specification*, Internet Engineering Task Force (IETF) MANET Working Group, Internet Draft, Jul. 20, 2001.

Ogier et al., *Topology Broadcast Based on Reserve-Path Forwarding (TBRPF)*, Internet Engineering Task Force (IETF) MANET Working Group, Internet Draft, Jan. 10, 2002.

Gerla et al., *Landmark Routing Protocol(LANMAR)for Large Scale Ad Hoc Networks*, Internet Engineering Task Force (IETF) MANET Working Group, Internet Draft, Dec. 17, 2001.

Hu et al., *Flow State in the Dynamic Socurce Routing Protocol for Mobile Ad Hoc Networks*, Internet Engineering Task Force (IETF) MANET Working Group, Internet Draft, Feb. 23, 2001.

Gerla et al., *Fisheye State Routing Protocol (FSR) for Ad Hoc Networks*, Internet Engineering Task Force (IETF) MANET Working Group, Internet Draft, Dec. 17, 2001.

Johnson et al., *The Dynamic Source Routing Protocol for Mobile Ad Hoc Networks (DSR)*, Internet Engineering Task Force (IETF) MANET Working Group, Internet Draft, Nov. 21, 2001.

Perkins et al., *Ad hoc On-Demand Distance Vector (ADOV) Routing*, Internet Engineering Task Force (IETF) MANET Working Group, Internet Draft, Nov. 9, 2001.

Chakrabarti et al., "*QoS Issues in Ad Hoc Wireless Networks*", , IEEE Communications Magazine, (Feb. 2001), pp. 142-148.

Chen, "*Routing Support for Providing Guaranteed End-to-End Quality-of-Service*," Ph.D. thesis, Univ. of Illinois at Urbana-Champaign, http://cairo.cs.uiuc.edu/papers/Scthesis.ps, 1999.

Jin et al., *A Hierarchical Routing Protocol for Large Scale Ad Hoc Network*, IEEE 1999, pp. 379-385.

Gerla et al., *Multicluster, Mobile, Multimedia Radio Network*, Wireless Networks I, 1995, pp. 255-265.

\* cited by examiner

LOAD LEVELING IN MOBILE AD-HOC NETWORKS TO SUPPORT END-TO-END DELAY REDUCTION, QOS AND ENERGY LEVELING

FIELD OF THE INVENTION

The present invention relates to the field of communications networks, and, more particularly, to mobile ad hoc networks and related methods.

BACKGROUND OF THE INVENTION

Wireless networks have experienced increased development in the past decade. One of the most rapidly developing areas is mobile ad-hoc networks (MANETs). Physically, a MANET includes a number of geographically-distributed, potentially mobile nodes sharing one or more common radio channels. Compared with other types of networks, such as cellular networks or satellite networks, the most distinctive feature of MANETS is the lack of any fixed infrastructure. The network is formed of mobile and stationary nodes, and is created on the fly as the nodes communicate with each other. The network does not depend on a particular node and dynamically adjusts as some nodes join or others leave the network.

In a hostile environment where a fixed communication infrastructure is unreliable or unavailable, such as in a battle field or in a natural disaster area struck by earthquake or hurricane, a MANET can be quickly deployed to provide much needed communications. While the military is still a major driving force behind the development of these networks, ad-hoc networks are quickly finding new applications in civilian or commercial areas. MANETs will allow people and applications to exchange data in the field or in a class room without using any network structure except that which they create by simply turning on their computers or PDAs.

As wireless communication increasingly permeates everyday life, new applications for MANETs will continue to emerge and become an important factor in wireless communications. Yet, MANETs pose serious challenges to designers. Due to the lack of a fixed infrastructure, nodes must self-organize and reconfigure as they move, join or leave the network. All nodes are essentially the same, and there is no natural hierarchy or central controller in the network. All functions have to be distributed among the nodes. Nodes are often powered by batteries and have limited communication and computation capabilities. Also, the bandwidth of the system is usually limited. The distance between two nodes often exceeds the radio transmission range, and a transmission may have to be relayed by other nodes before reaching its destination. Consequently, a MANET network typically has a multi-hop topology, and this topology changes as the nodes move around.

The MANET working group of the Internet Engineering Task Force (IETF) has been actively evaluating and standardizing routing protocols, including multicasting protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood and not far away from itself).

A routing protocol needs to adapt to frequent topology changes, possibly with less than accurate information. Because of these unique requirements, routing in these networks is very different than in others. Gathering fresh information about the entire network is often costly and impractical. Some routing protocols are reactive (i.e., on-demand) protocols. That is, they collect routing information only when necessary and only to destinations to which they need routes, and do not maintain unused routes. In this way the routing overhead may be reduced compared to pro-active protocols, which maintain optimal routes to all destinations at all time. Ad Hoc on Demand Distance Vector (AODV), Dynamic Source Routing (DSR) and Temporally Ordered Routing Algorithm (TORA) are representatives of reactive routing protocols presented at the MANET working group.

An example of a proactive routing protocol is Optimal Link State Routing (OLSR). Examples of other various routing protocols include Destination Sequenced Distance-Vector (DSDV) routing which is disclosed in U.S. Pat. No. 5,412,654 to Perkins, and the Zone Routing Protocol (ZRP) which is disclosed in U.S. Pat. No. 6,304,556 to Haas. ZRP is a hybrid protocol using both proactive and reactive approaches.

These conventional routing protocols use a best effort approach in selecting a route from the source node to the destination node. Typically, minimizing the number of hops is the main criteria in such approaches.

Quality-of-service (QoS) routing in MANETs is gaining interest. To provide quality-of-service, a protocol needs not only to find a route but also to identify and/or secure the resources along the route. Because of the potentially limited, shared bandwidth of the network, and the lack of a central controller which can account for and control these limited resources, nodes must negotiate with each other to manage the resources required for QoS routes. This is further complicated by frequent topology changes. Due to these constraints, QoS routing is more demanding than best-effort or minimum-hop routing.

Some examples of QoS routing approaches are set forth by Chenxi Zhu in the publication entitled "Medium Access Control and Quality-of-Service Routing for Mobile Ad Hoc Networks," 2001, and by M. Mirhakkak et al. in the publication entitled "Dynamic Quality-of-Service for Mobile Ad Hoc Networks," MITRE Corp., 2000. Zhu discusses establishing bandwidth guaranteed QoS routes in small networks whose topologies change at a low to medium rate. Mirhakkak et al. are concerned with resource reservation requests which specify a range of QoS values while the network makes a commitment to provide service within this range.

Since MANETs are still in the initial stages of development, most attempts to implement QoS functionality in MANETs thus far have focused primarily on using QoS parameters to establish routes, as is the case with some of the above-noted prior art approaches. Yet, as MANETs continue to increase in size and complexity, further QoS functionality may be needed along with ways to level loads in the network to reduce delays and optimize energy usage.

SUMMARY OF THE INVENTION

In view of the foregoing background, it is therefore an object of the present invention to provide a method, mobile node and mobile ad hoc network that supports end-to-end delay reduction, QoS and energy usage leveling.

This and other objects, features, and advantages in accordance with the present invention are provided by a method for routing message data from a source node to a destination node in a mobile ad hoc network (MANET). The MANET has a plurality of intermediate mobile nodes between the source node and the destination node, and a plurality of wireless communication links connecting the nodes together. The method includes prioritizing the message data according to a type-of-service (ToS), discovering routes from the source node to the destination node, and ranking the discovered routes according to quality of service (QoS). Message data is distributed to the destination node on the discovered routes based upon the ToS of the message data and the QoS of the discovered routes, including distributing message data having a same ToS on multiple discovered routes, and distributing message data having higher priority ToS, e.g. delay sensitive message data and/or large volume message data, on higher ranked discovered routes.

Ranking the discovered routes according to QoS may include determining whether intermediate mobile nodes on discovered routes between the source node and the destination node are service sensitive nodes, such as power critical nodes and/or traffic bottleneck nodes. Also, ranking the discovered routes according to QoS may include determining an end-to-end delay of each discovered route, and may include measuring at least one of link delay, node capacity, node available capacity, and link reliability. Route entries may be stored in a route cache, each route entry corresponding to one of the discovered routes.

Objects, features, and advantages in accordance with the present invention are also provided by a mobile node for use in a mobile ad hoc network. The mobile node includes a communications device to wirelessly communicate with other nodes of the plurality of nodes via the wireless communication links, and a controller to route communications via the communications device. The communications include message data prioritized according to a type-of-service (ToS). The controller includes a route discovery unit to discover routing to a destination node, a route ranking unit to rank discovered routes according to quality of service (QoS), and a message data distribution unit to distribute the message data to the destination node along a plurality of the discovered routes based upon the ToS of the message data and the QoS of the discovered routes so that message data having a same ToS is distributed on multiple discovered routes, and message data having higher priority ToS is distributed on higher ranked discovered routes. Message data having higher priority ToS includes delay sensitive message data and/or large volume message data.

The route ranking unit preferably determines whether intermediate mobile nodes on discovered routes between the source node and the destination node are service sensitive nodes, such as power critical nodes and/or traffic bottleneck nodes. The route ranking unit may determine an end-to-end delay of each discovered route, and may measure link delay, node capacity, node available capacity, and/or link reliability. The route ranking unit preferably includes a route cache to store route entries corresponding to one of the discovered routes.

DETAILED DESCRIPTION OF THE PREFERRED EMBODIMENTS

Figure 1:
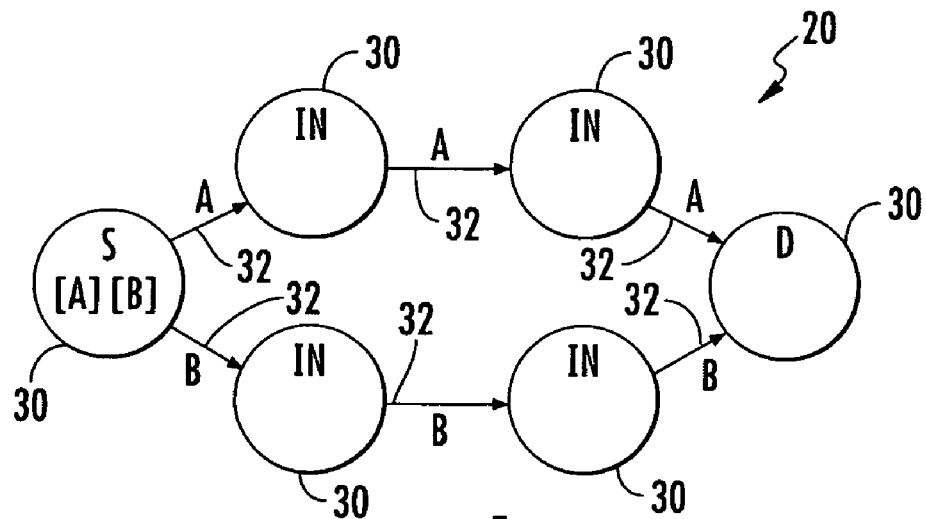
FIGS. 1–3 are schematic diagrams of a mobile ad hoc network in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer or other programmable apparatus implemented process such that the instructions which execute on the computer or other programmable apparatus provide steps for implementing the functions specified in the flowchart block or blocks.

Referring initially to FIG. 1–4, a method for routing message data from a source node S to a destination node D in a mobile ad hoc network 20 will now be described. The network 20 includes a plurality of mobile nodes 30 including the source node S and the destination node D with intermediate nodes IN therebetween. The nodes 30, such as laptop computers, personal digital assistants (PDAs) or mobile phones, are connected by wireless communication links 32 as would be appreciated by the skilled artisan. The method begins (block 100) and includes prioritizing the message data according to a type-of-service (ToS), as indicated at block 102 in FIG. 4. At block 104, routes are discovered from the source node S to the destination node D, and then the discovered routes are ranked (block 106) according to quality of service (QoS).

Message data is distributed (block 108) to the destination node on the discovered routes based upon the ToS of the message data and the QoS of the discovered routes, including distributing message data having a same ToS on multiple discovered routes, and distributing message data having higher priority ToS, e.g. delay sensitive message data and/or large volume message data, on higher ranked discovered routes, as will be described in further detail below. As used herein, "message data" is intended to include any data that may be sent between nodes in the mobile ad-hoc network, including (but not limited to) video data, audio data, alphanumeric data, etc., as would be appreciated by the skilled artisan.

Ranking the discovered routes according to QoS may include determining whether intermediate mobile nodes IN on discovered routes between the source node S and the destination node D are service sensitive nodes (block 110), such as power critical nodes and/or traffic bottleneck nodes. Also, ranking the discovered routes according to QoS may include determining an end-to-end delay of each discovered route (block 112), and may include measuring at least one of link delay, node capacity, node available capacity, and link reliability. Route entries may be stored in a route cache, each route entry corresponding to one of the discovered routes. The method of the present invention may still follow the conventional procedures established by the protocol for best effort service.

Figure 2:
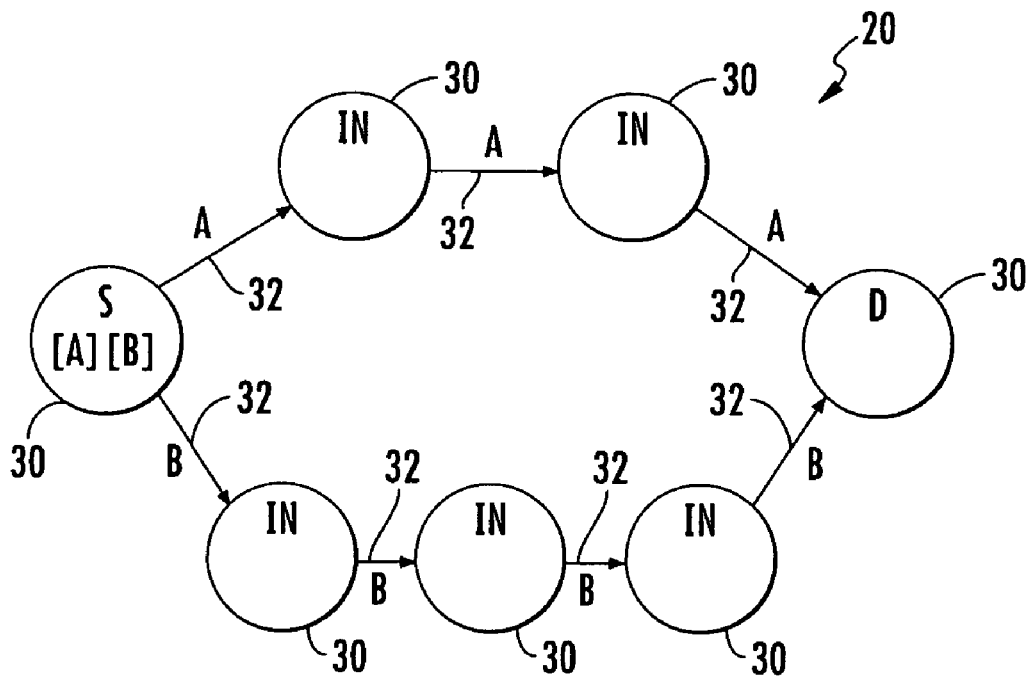
Figure 3:
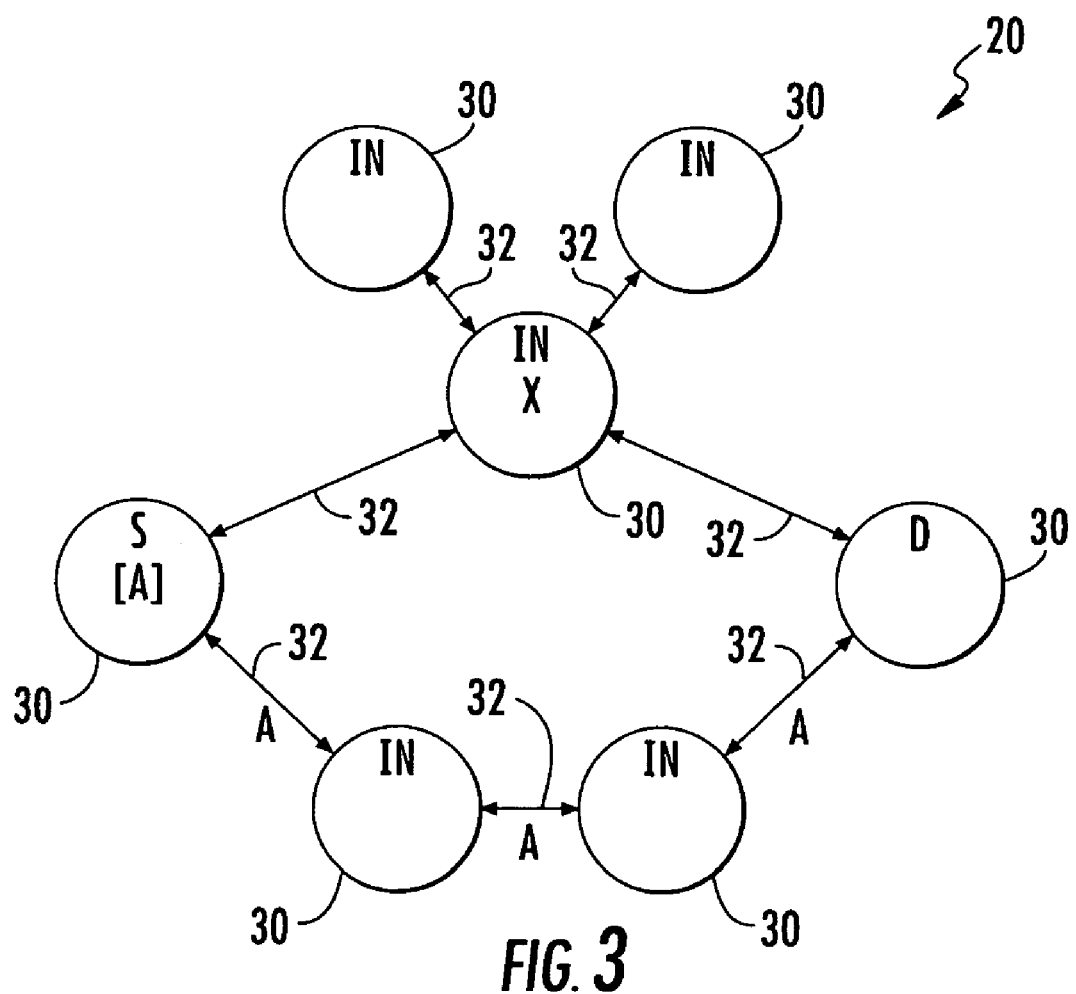
Figure 4:
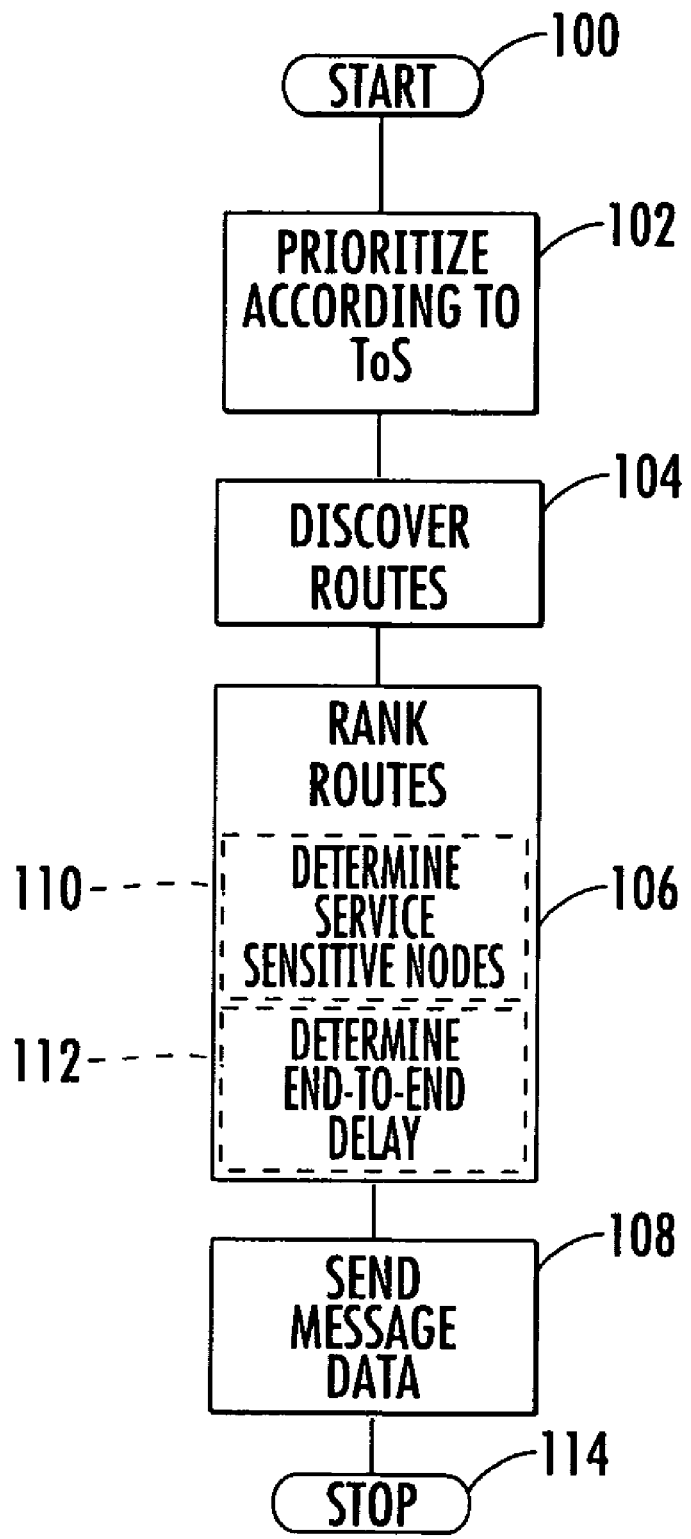
FIG. 4 is a flowchart illustrating the method steps for a mobile ad hoc network in accordance with the present invention.

FIGS. 1–3 illustrates three scenarios involving load leveling. The scenarios include an individual concept, two possibly complimentary concepts and two competing concepts. The first scenario, FIG. 1, illustrates performance enhancement without regard to QoS. In this case, the source node S generates traffic or message data A, B with the same Type of Service (ToS) and destination node D. There are two discovered routes with similar or different QoS and the message data A, B is split up to reduce the delay for both data flows. In other words, message data A and message data B are sent over separate routes to the destination node D.

In the second scenario, FIG. 2, again the source node S generates traffic or message data A, B with the same destination node D but this time having different ToS. Again, there are two routes but in this example, one route has a lower QoS than the other. For example, here, the second route includes more hops and is longer. The higher priority message data A is sent along the shorter route and the lower priority message data B is sent along the longer route. This is meant to favor the higher ToS, but it could potentially improve performance for both flows.

The third scenario, FIG. 3, illustrates the use of load leveling for energy usage leveling in the network 20. Here the source node S has two discovered routes to choose from but chooses not to use the shorter route because the shorter route has a service sensitive or power limited node X that is critical to one or more other routes, and there is another route without this service/power issue. These scenarios are not exhaustive but are meant to demonstrate that these three goals can be independent, cooperative or competitive and that load leveling should be applied in a manner which looks at all three in an integrated way.

The described method can be applied to any type of On-Demand or Reactive routing protocol, such as Dynamic Source Routing (DSR) or Ad-Hoc On-Demand Distance Vector (AODV) routing, or to any hybrid proactive/reactive protocol, such as Zone Routing Protocol (ZRP), as would be appreciated by the skilled artisan. The described procedures are easily applied to the DSR protocol. The conventional DSR message types RREQ, RREP, RRER are defined as optional packet types, and can be used as defined for the conventional operation of the protocol to support "best effort" traffic in a backwards compatibility mode. New optional packet types may be defined to support the measurement of certain link metrics. Definition of the required header fields for these types is straightforward based on the functions defined above.

As discussed, the present invention provides the discovery and use of multiple routes. The routing cache/table is tailored to utilize up to n routes simultaneously per destination. Regarding the use of metrics: Improved metrics can include a variety of measures such as link delay, link/node capacity, link/node available capacity, link reliability. More important metrics may depend on the traffic class such as: Delay sensitive traffic may require routes to be rank-ordered based on the delay metric; Large volume traffic may require routes to be rank-ordered based on the capacity metric.

Thus, as described, the present invention supports conventional ad hoc routing protocols such as DSR and AODV but significantly improves performance. Multiple routes can be used for load balancing, and the use of multiple routes can provide more timely backup routes when path failures occur.

Figure 5:
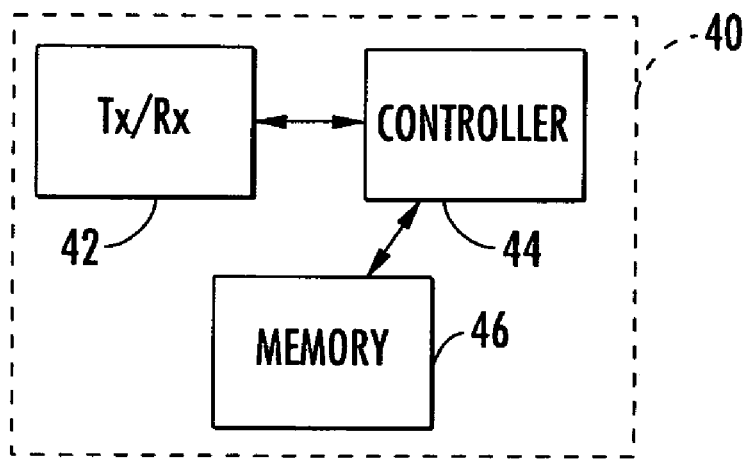
FIG. 5 is a schematic diagram illustrating a router of a node in accordance with the network of the present invention.
Figure 6:
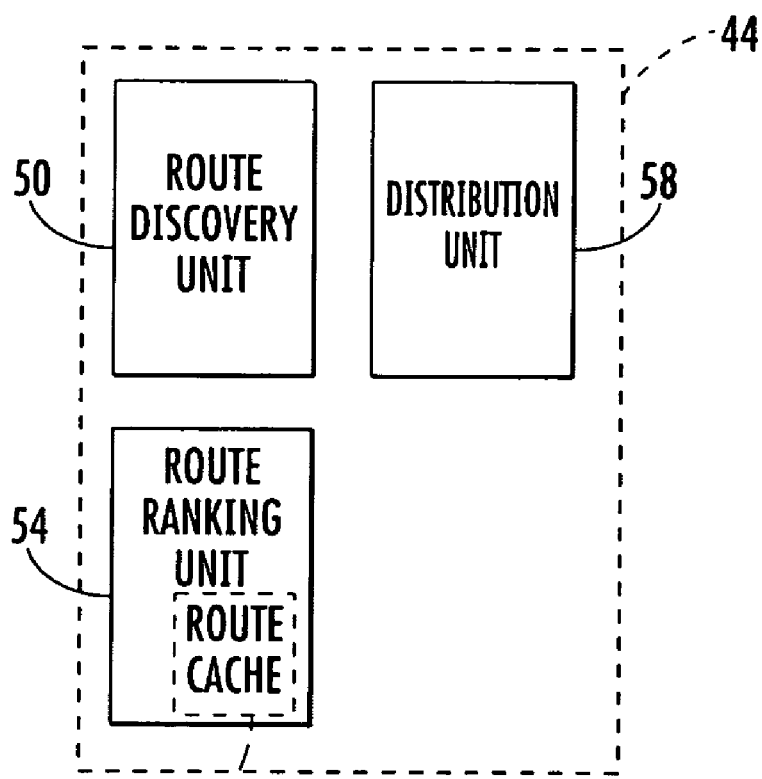
FIG. 6 is a schematic diagram illustrating the details of the controller of the router in FIG. 5.

Referring now additionally to FIGS. 5 and 6, a system aspect of the invention will be described. A mobile ad hoc network 20 includes a plurality of mobile nodes 30, and a plurality of wireless communication links 32 connecting the plurality of mobile nodes together. Each mobile node includes a router 40 (FIG. 5) that has a communications device 42 to wirelessly and uni-directionally or bi-directionally communicate with other nodes via the wireless communication links 32, and a controller 44 to route communications via the communications device 42.

Also, a memory 46 may be included as part of the controller 44 or in connection with the controller. The communications include message data prioritized according to a type-of-service (ToS).

As shown in FIG. 6, the controller 44 includes a route discovery unit 50 to transmit route requests to other nodes to discover routing to a destination node. A route ranking unit 54 ranks discovered routes according to QoS, and a message data distribution unit 58 distributes the message data to the destination node along a plurality of the discovered routes based upon the ToS of the message data and the QoS of the discovered routes so that message data having a same ToS is distributed on multiple discovered routes, and message data having higher priority ToS is distributed on higher ranked discovered routes. Message data having higher priority ToS includes delay sensitive message data and/or large volume message data. Again, the Qos ranking preferably includes a measurement of link delay, link capacity, link available capacity, and/or link reliability.

The message data distribution unit 58 distributes different message data along each of the plurality of discovered routes. The route ranking unit 54 comprises a route cache 56 for storing route entries each corresponding to one of the discovered routes. The ranking unit 54 may repeat route entries in the route cache for different classes of message data, such as delay sensitive message data and large volume message data.

The route ranking unit 54 preferably determines whether intermediate mobile nodes on discovered routes between the source node and the destination node are service sensitive nodes, such as power critical nodes and/or traffic bottleneck nodes. The route ranking unit 54 may determine an end-to-end delay of each discovered route, and may measure link delay, node capacity, node available capacity, and/or link reliability. The route ranking unit 54 includes a route cache 56 to store route entries corresponding to one of the discovered routes.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for routing message data from a source node to a destination node in a mobile ad hoc network comprising a plurality of intermediate mobile nodes between the source node and the destination node, and a plurality of wireless communication links connecting the nodes together, the method comprising:
   prioritizing the message data according to a type-of-service (ToS);
   discovering routes from the source node to the destination node;
   ranking the discovered routes according to quality of service (QoS); and
   distributing message data to the destination node on the discovered routes based upon the ToS of the message data and the QoS of the discovered routes, including
     distributing message data having a same ToS on multiple discovered routes, and
     distributing message data having higher priority ToS on higher ranked discovered routes.

2. A method according to claim 1 wherein ranking the discovered routes according to QoS includes determining whether intermediate mobile nodes on discovered routes between the source node and the destination node are service sensitive nodes.

3. A method according to claim 2 wherein service sensitive nodes comprise power critical nodes.

4. A method according to claim 2 wherein service sensitive nodes comprise traffic bottleneck nodes.

5. A method according to claim 1 wherein ranking the discovered routes according to QoS includes determining an end-to-end delay of each discovered route.

6. A method according to claim 5 wherein ranking the discovered routes according to QoS includes measuring at least one of link delay, node capacity, node available capacity, and link reliability.

7. A method according to claim 1 wherein ranking the discovered routes according to QoS comprises storing route entries in a route cache, each route entry corresponding to one of the discovered routes.

8. A method according to claim 1 wherein message data having higher priority ToS comprises delay sensitive message data and large volume message data.

9. A method for routing message data from a source node to a destination node in a mobile ad hoc network comprising a plurality of intermediate mobile nodes between the source node and the destination node, and a plurality of wireless communication links connecting the nodes together, the method comprising:
   prioritizing the message data according to a type-of-service (ToS);
   ranking routes from the source node to the destination node according to an end-to-end delay metric;
   determining whether intermediate mobile nodes on routes between the source node and the destination node are service sensitive nodes; and
   distributing message data to the destination node on the routes based upon the ToS of the message data, the end-to-end delay metric, and the service sensitive node determination
     including distributing message data having a same ToS on multiple routes, and distributing message data having higher priority ToS on higher ranked routes.

10. A method according to claim 9 wherein message data having higher priority ToS comprises delay sensitive message data and large volume message data.

11. A method according to claim 9 wherein service sensitive nodes comprise power critical nodes.

12. A method according to claim 9 wherein service sensitive nodes comprise traffic bottleneck nodes.

13. A method according to claim 9 wherein the end-to-end delay metric is based upon at least one of link delay, node capacity, node available capacity, and link reliability.

14. A mobile node for use in a mobile ad hoc network defined by a plurality of mobile nodes and a plurality of wireless communication links connecting the plurality of mobile nodes together, the mobile node comprising:
   a communications device to wirelessly communicate with other nodes of the plurality of nodes via the wireless communication links; and
   a controller to route communications via the communications device, the communications comprising message data prioritized according to a type-of-service (ToS), the controller comprising
     a route discovery unit to discover routing to a destination node,
     a route ranking unit to rank discovered routes according to quality of service (Qos), and
     a message data distribution unit to distribute the message data to the destination node along a plurality of the discovered routes based upon the ToS of the message data and the Qos of the discovered routes so that message data having a same ToS is distributed on multiple discovered routes, and message data having higher priority ToS is distributed on higher ranked discovered routes.

15. A mobile node according to claim 14 wherein the route ranking unit determines whether intermediate mobile nodes on discovered routes between the source node and the destination node are service sensitive nodes.

16. A mobile node according to claim 15 wherein service sensitive nodes comprise power critical nodes.

17. A mobile node according to claim 15 wherein service sensitive nodes comprise traffic bottleneck nodes.

18. A mobile node according to claim 14 wherein the route ranking unit determines an end to end delay of each discovered route.

19. A mobile node according to claim 14 wherein the route ranking unit measures at least one of link delay, node capacity, node available capacity, and link reliability.

20. A mobile node according to claim 14 wherein the route ranking unit includes a route cache to store route entries corresponding to one of the discovered routes.

21. A mobile node according to claim 14 wherein message data having higher priority ToS comprises delay sensitive message data and large volume message data.

* * * * *